UNITED STATES PATENT OFFICE.

ARTHUR ERNEST KRAUSE, OF JERSEY CITY, NEW JERSEY.

METHOD OF REMOVING OIL FROM WATER.

SPECIFICATION forming part of Letters Patent No. 705,253, dated July 22, 1902.

Application filed May 23, 1901. Serial No. 61,516. (No specimens.)

*To all whom it may concern:*

Be it known that I, ARTHUR ERNEST KRAUSE, a citizen of the United States, residing at Jersey City, in the county of Hudson and State of New Jersey, have invented a certain new and useful Method of Removing Oil from Water; and I do hereby declare the following to be a full, clear, and exact description of the invention, such as will enable others skilled in the art to which it appertains to make and use the same.

My invention relates to a method of removing oil and oily matter from water, and is particularly intended for use in connection with condensing steam plants for removing from the condensed steam the oil which it contains, so that the water may be used again in the boiler without any of the harmful effects which are experienced when oily feed-water is used in steam-boilers.

Heretofore the separation of the oil from the exhaust-steam of steam engines, pumps, and the like has been attempted by the use of oil-separators which act upon the exhaust-steam before the latter reaches the condenser, by filters intended to filter the oil from the feed-water before it reaches the boiler, and by the addition of chemicals to the feed-water capable of producing therein a flocculent precipitate which in settling may gather up and carry down with it the oil in the water; but the oil in condensed steam usually exists therein in an emulsified condition, in which condition it will pass through filters to a considerable extent, so that the separation of the oil by filtration is not efficient or sufficient. The oil particles in exhaust-steam before condensation of the latter exist in such a finely-divided condition that mechanical oil-separators operating by centrifugal action or otherwise have not proved sufficient for the purpose. There are serious objections to the removal of the oil from the feed-water by the addition thereto of chemicals, which by their action on each other or on the oil produce a precipitate, as above described, because such chemicals, if present in the water when it reaches the boiler, have a deleterious action, and to use them in such quantities and such exact proportions that no deleterious substance shall remain in the water when it reaches the boiler requires much care and skill. Various other means have also been devised for removing oil from feed-water, but have proved unsatisfactory for various reasons.

The object of my invention is to remove the oil from feed-water of boilers and other water efficiently and economically and to avoid the objections inherent to the methods of separation heretofore used.

My invention consists in adding to the feed-water a solid non-gelatinous substance, preferably in a pulverulent, granular, or tufty form, which has an attraction for the oil and because of such attraction will collect the oil in the water, so that when this substance is removed from the water by settling and removal of the supernatant fluid or by filtration the water may be substantially free from oil.

My invention consists, further, in recovering the substance by which the oil is thus extracted by removing the oil therefrom in any convenient manner, so that such substance may be capable of repeated use.

I have discovered that magnesium bodies such as, and especially the oxid, hydrated oxid, carbonate, and silicate of magnesium, all of which substances are insoluble or only sparingly soluble in water, possess to a remarkable degree the property of attracting oil present in water and so of removing the same from the water. The substance employed may be a manufactured product, or it may be one of the forms of magnesium bodies which occur in nature. I have discovered that magnesite, dolomite, serpentine, olivine, asbestos, and allied minerals and asbestic rock, and especially the fibrous variety of serpentine termed "chrysotile," which is commonly considered one form of asbestos, possess this property. All of these substances are insoluble or only sparingly soluble in water. Chrysotile, if used, may be either in a finely-divided or in a tufty condition. The other substances mentioned should be used, preferably, in a finely-pulverized condition. In purifying oily water by means of these substances the purifying material is mixed in with the water, preferably while the latter is within a suitable tank or equivalent receptacle, and the water is then thoroughly agitated. The agitation brings the particles of the magnesium body into intimate contact with the particles of oil carried by the water, and these oil particles are gathered up by the particles of the purifying material. The purifying material, with the oil carried by it, may then be removed from the water either by means of filters or by allowing the solid matter to settle and drawing off the water. In either case the water is rendered free from oil and is clarified. Before adding the purifying material, as above described, the water may first be passed through a filter to remove as much of the oil as can be removed in that way readily, or the oil floating on the surface of the water may be skimmed off, and, if desired, the steam before it is condensed may be passed through any of the familiar oil-separators to remove so much of the oil as may be removed in that manner. The purifying material employed after being separated from the water, as above described, may be freed from its oil by treating it with naphtha or alcohol, which will dissolve the oil, or by treating it with ammonia, which will convert the oil into a soap, or in any other suitable manner. The purifying material is thereby recovered, and the same material may be used over and over again with little or no loss.

I am aware that magnesium bodies have been used before for the purification of water; but, so far as I am aware, such bodies have always been used heretofore in connection with substances or in water containing salts capable of acting chemically upon the magnesium body employed, and thereby of producing a precipitate of earthy salts. So far as I am aware magnesium bodies have not been used heretofore for the simple removal of oil from water containing no substance capable of acting chemically on the magnesium body and without the joint use of other chemicals capable of acting chemically upon the magnesium body. In my process the magnesium bodies have no chemical action, so far as I have been able to discover, the action appearing to be purely physical and to be due to the peculiar property possessed by such bodies of exerting a strong physical attraction for the oil, nor is the purifying action of the magnesium bodies in my process a filtering or straining action, for it is not necessary to add the materials to the water in such quantities that they could exert in settling any effective filtering action, while it is essential that the water shall be agitated, so as to bring the purifying material into contact with all of the oil particles in the water.

I am aware that gelatinous compounds have some attraction for oil and have been used for the purification of oily feed-water; but the use of such compounds is not advantageous, because it is exceedingly difficult to separate them from the water. The most practicable method is by filtration; but filtration is slow, because the gelatinous mass clogs the filter; but the magnesium bodies which I prefer to use are not gelatinous in any sense, and hence do not clog the filter.

Having thus completely described my invention, what I claim, and desire to secure by Letters Patent, is—

1. The herein-described process of extracting oil from water, which consists in mixing with the mixture of oil and water a magnesium body of the character described, that is, one that is insoluble or only sparingly soluble in water, thereby causing said substance to gather the oil particles by physical action, and finally separating said body and gathered oil from the water, substantially as set forth.

2. The herein-described process of extracting oil from water, which consists in mixing with the mixture of oil and water a finely-divided magnesium body of the character described, that is, one that is insoluble or only sparingly soluble in water, thereby causing said substance to gather the oil particles by physical action, and finally separating said body and gathered oil from the water, substantially as set forth.

3. The herein-described process of extracting oil from water, which consists in mixing serpentine with the mixture of oil and water, thereby causing the serpentine to gather the oil particles by physical action, and finally separating the serpentine and gathered oil from the water, substantially as set forth.

In testimony whereof I affix my signature in the presence of two witnesses.

ARTHUR ERNEST KRAUSE.

Witnesses:
A. H. PERLES,
H. M. MARBLE.